(12) United States Patent
Dhawan et al.

(10) Patent No.: US 10,269,080 B2
(45) Date of Patent: Apr. 23, 2019

(54) METHOD AND APPARATUS FOR PROVIDING A RESPONSE TO AN INPUT POST ON A SOCIAL PAGE OF A BRAND

(71) Applicant: Adobe Inc., San Jose, CA (US)

(72) Inventors: Anmol Dhawan, Uttar Pradesh (IN); Walter Wei-Tuh Chang, San Jose, CA (US); Ashish Duggal, New Delhi (IN); Sachin Soni, New Delhi (IN)

(73) Assignee: ADOBE INC., San Jose, CA (US)

( * ) Notice: Subject to any disclaimer, the term of this patent is extended or adjusted under 35 U.S.C. 154(b) by 841 days.

(21) Appl. No.: 14/553,292

(22) Filed: Nov. 25, 2014

(65) Prior Publication Data

US 2016/0148325 A1    May 26, 2016

(51) Int. Cl.
*G06Q 50/00*    (2012.01)
*G06Q 30/02*    (2012.01)

(52) U.S. Cl.
CPC ......... *G06Q 50/01* (2013.01); *G06Q 30/0269* (2013.01)

(58) Field of Classification Search
CPC ............... G06Q 50/01; G06Q 30/0269; G06Q 30/0605; G06N 99/005
USPC ........................................................ 709/217
See application file for complete search history.

(56) References Cited

U.S. PATENT DOCUMENTS

| | | | | |
|---|---|---|---|---|
| 9,336,268 B1* | 5/2016 | Moudy | ............. | G06F 17/30412 |
| 2010/0036934 A1* | 2/2010 | Bruster | ................... | G06F 17/30 709/219 |
| 2010/0049590 A1* | 2/2010 | Anshul | ................ | G06F 17/2785 705/7.32 |
| 2012/0233127 A1* | 9/2012 | Solmer | ............. | G06F 17/30073 707/661 |
| 2013/0328932 A1* | 12/2013 | Kim | ....................... | H04L 65/403 345/636 |
| 2014/0280236 A1* | 9/2014 | Faller | .................. | G06F 17/3053 707/749 |
| 2014/0297764 A1* | 10/2014 | Skiba | .................. | H04M 3/5175 709/206 |
| 2015/0006442 A1* | 1/2015 | Ogilvie | ................ | G06N 99/005 706/12 |
| 2015/0095176 A1* | 4/2015 | Schilling | ............ | G06Q 30/0601 705/26.1 |
| 2015/0127418 A1* | 5/2015 | Piepgrass | ........... | G06Q 30/0201 705/7.29 |
| 2015/0172145 A1* | 6/2015 | Skiba | ...................... | H04L 67/10 709/224 |

(Continued)

*Primary Examiner* — Thomas J Dailey
*Assistant Examiner* — Aye M Aung
(74) *Attorney, Agent, or Firm* — Keller Jolley Preece

(57) ABSTRACT

A method for providing a response to an input post on a social page of a brand is provided. The input post is detected upon posting of the input post on the social page of the brand. The social page is present on a social channel. An inquiry regarding the brand is identified from content of the input post. At least one social post is determined from already posted posts on one or more social channels based on the inquiry. The at least one social post is associated with the brand. A response post is created using the at least one social post. The response post addresses the inquiry. The response post is then posted on the social page of the social channel as a reply to the input post. An apparatus for performing the method as described herein is also provided.

20 Claims, 5 Drawing Sheets

(56) References Cited

U.S. PATENT DOCUMENTS

2015/0199770 A1* 7/2015 Wallenstein .......... G06Q 50/01
　　　　　　　　　　　　　　　　　　　　　705/26.2
2016/0063537 A1* 3/2016 Kumar Goel ...... G06Q 30/0244
　　　　　　　　　　　　　　　　　　　　　705/14.43

* cited by examiner

Text: 15 Ways to Improve Battery Life on Samsung Galaxy S3 or Galaxy Note 2 - International Business Times
www.xyz.pqr Language: English Submit Result:
*{Spam} is the spam text.
*{Neutural+Sentiment} is the non-spam text.
*{Foreign Language} is the non-spam text.

Neutural+Sentiment

FIGURE 3B

METHOD AND APPARATUS FOR PROVIDING A RESPONSE TO AN INPUT POST ON A SOCIAL PAGE OF A BRAND

BACKGROUND

Currently available social networking websites, such as Facebook, allows a marketer of a brand to create a social page, such as a Facebook page, for the brand. A viewer of the brand's social page posts a query regarding the brand on the brand's social page. The marketer then responds to the query by posting a response on the social page. However, with time, the number of queries that are posted by the viewers have increased tremendously while response time that the viewers expect from the brand has remained the same. Therefore, there remains an unmet need to provide response to the viewers quickly. Also, studies have shown that the viewers who do not get a response or get a late response from the brand tend to walk away from the brand than the viewers who get a quick response.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for providing a response to an input post on a social page of a brand is provided. The input post is detected upon posting of the input post on the social page of the brand. The social page is present on a social channel. An inquiry regarding the brand is identified from content of the input post. At least one social post is determined from already posted posts on one or more social channels based on the inquiry. The at least one social post is associated with the brand. A response post is created using the at least one social post. The response post addresses the inquiry. The response post is then posted on the social page of the social channel as a reply to the input post.

An apparatus for substantially performing the method as described herein is also provided.

BRIEF DESCRIPTION OF THE DRAWINGS

FIG. 3A, FIG. 3B, and FIG. 3C are diagrams illustrating procedure of providing response to the input post on the social page of the brand using an example, according to one or more embodiments.

Figure 1:
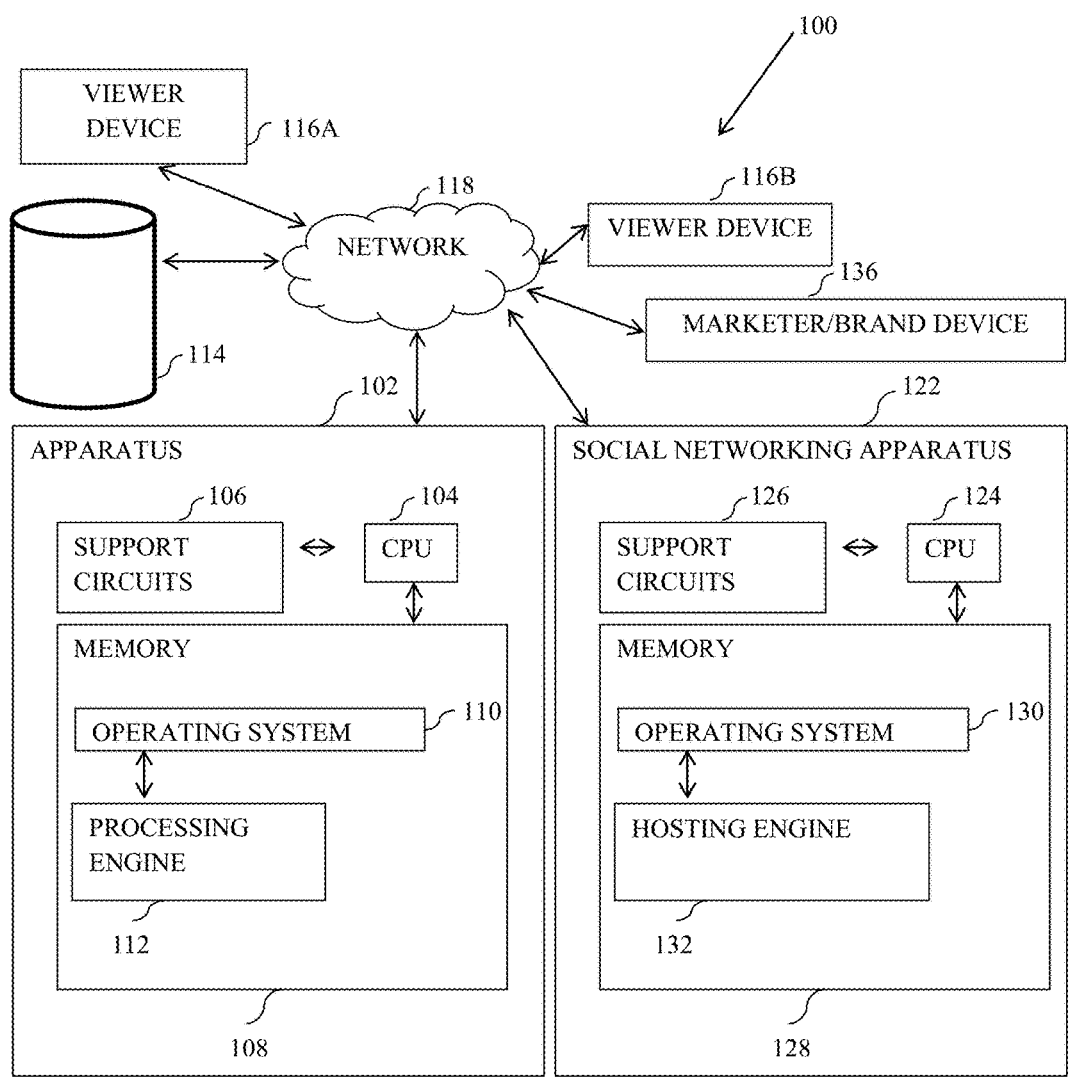
FIG. 1 is a diagram of an environment for providing response to an input post on a social page of a brand, according to one or more embodiments.

While the procedure and apparatus is described herein by way of example for several embodiments and illustrative drawings, those skilled in the art will recognize that the procedure and apparatus provided herein is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the procedure and apparatus. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Overview

One prior procedure for providing a response to an input post on a social page of a brand includes preparing the response manually by a marketer of the brand and posting the response on the social page. However, manual creation of the response is not scalable with the tremendous increase in the number of queries. The brands have to keep a check on ever increasing labor costs and, practically, the brands do not prefer hiring a lot of resources just for answering the queries. Further, the marketer also needs some time to respond. All this adds up to delay in providing the response to the input post and results in unhappy viewer walking away from the brand or purchase. Therefore, there remains an unmet need to provide response to the viewers quickly.

In accordance to embodiments of the present invention and as described in more detail below, a procedure for providing automatic response to an input post on a social page of a brand is provided. A marketer of the brand creates the social page for the brand on a social networking website. A viewer of the social page, for example Facebook page, of the brand posts the input post on the social page. The input post is received by an application, such as Adobe Social, used to manage content on the social networking website. The marketer maintains an account with the application. The input post is detected by the application upon posting of the input post on the social page. An inquiry regarding the brand is identified from the input post. For identifying the inquiry, the input post is parsed to identify feature vectors, for example keywords, of the input post. Already posted one or more posts are retrieved from one or more social channels, for example Facebook, Twitter etc. The retrieved posts include posts posted by the marketer, posts posted by other viewers, or links posted by the marketer or other viewers. The posts are parsed to identify feature vectors for each post. A similarity parameter is then determined between the feature vectors of the input post and of the posts. Various techniques, for example Cosine similarity technique, can be used to determine the similarity parameter. The post having the similarity parameter meeting certain predefined condition is determined as a post (hereinafter referred to as relevant post) relevant to the input post. The relevant post is then processed to generate a response post. The relevant post is either automatically posted on the social page of the brand as the response post to the input post or is provided as recommendation to the marketer. The marketer can then provide an input to post the relevant post as it is on the social page of the brand as the response post or can provide an input to generate the response post from the relevant post by altering the relevant post. The response post generated by altering the relevant post is then posted as a reply to the input post. The response post addresses the inquiry identified from the input post.

In some embodiments, the relevant post is processed to determine sentiment of the relevant post and to ensure that the relevant post is not a spam. Various available techniques can be used for determining the sentiment and for checking that the relevant post is not a spam.

Advantageously, posting response post reduces time required to respond to input post and helps in retaining viewers as potential customers of the brand. The quick response time further aids in maintaining positive sentiments regarding the brand.

Terms Definitions (in Addition to Plain and Dictionary Meaning of the Terms)

A social channel is a social networking website or a social networking application (hereinafter referred to as the social networking website in combination). A social channel is an electronic channel that enables social communication among one or more entities. Examples of one or more entities include, but are not limited to, users and companies. Examples of the social channel include, but are not limited to, Facebook, Twitter, Myspace, LinkedIn, Google Plus etc.

A social page is a page on the social networking website created by a brand for its own usage. Such social page includes posts related to the brand. A marketer or owner or other responsible personnel may be the owner or moderator of a social account of the brand with the social networking website. Each brand or company can create and maintain a dedicated social account for its own usage. Using the social account the social page is created by the brand. The brand typically reaches out to customer base via the social page. The brand also posts updates regarding or concerning the brand on the social page. The social page can be managed manually by the responsible personnel or can be managed using one or more professional tools available for managing the social page. Examples of the professional tools include, but are not limited to, Adobe Social.

A brand is a company or an entity or a person. The brand can create an account on the social networking website by creating an account. The account is maintained by a personnel of the brand. The brand typically reaches out to customer base via the social page. The brand also posts updates regarding or concerning the brand on the social page. Examples of the brand include, but are not limited to companies such as Adobe, Microsoft etc.

A viewer or a user is an entity or a person that consumes or visits or performs social activities on the social page of a brand. Examples of the social activities include, but are not limited to, posting posts, posting comments, viewing content on the social page, inputting a query etc. The social activity is an electronic activity performed by the viewer via the social page.

A marketer is an entity or a person who creates or manages the social page of the brand, or who has authority to do so. A marketer can be any personnel who is tasked with creating or managing the social page of the brand and who has access to the social account of the brand. Managing the social page includes monitoring the queries posted by viewers on the social page, posting responses to the queries on the social page, posting updates regarding or concerning the brand on the social page, reaching out to the customers via the social page etc.

A post or a social post is electronic content that is created and published via a social channel. Examples of the post include, but are not limited to, comments posted on the social channel, links posted on the social channel, image posted on the social channel, video posted on the social channel, or a combination of one or more of these. The marketer can create posts for publishing on the social page of the brand. Such posts can be referred to as posts posted by the marketer or by the brand. The viewer or any other user can also post comments on the social page of the brand and such comments are considered as posts.

An input post is a keyword or a set of keywords or a sentence inputted electronically by the viewer. The input post can be a question or any other inquiry that the viewer wants to get answered by the brand. The input post is received via the social page of the brand. The viewer posts the input post on the social page of the brand. In some embodiments, the input post is posted as a post on the social page and is not a search query entered in a search box on the social page.

A response post is electronic content posted in reply to the input post. The response post is created based on the social post (relevant post) determined to be relevant to the input post. The response post is based on at least one of the relevant post posted by the marketer on one or more social channels, or relevant post posted by the viewer on the one or more social channels, or links posted by the viewers or the brand on the one or more social channels. In some embodiments, the response post is based on posts or links already posted on the social page of the brand on the one or more social channels. In some embodiments, the response post is posted as a reply to input post on the social page and is not a search result provided as a response to an input search query. The response post results in addition of content to the social page of the brand. The response post includes an answer to the question or inquiry posted in the input post. The response post is also associated with the brand.

A relevant post is a social post determined to be relevant to the input post. The relevant post is determined to be the social post that is relevant to the inquiry identified from the input post. In other words, the relevant post relates to the inquiry and includes content relevant or related to the inquiry. In one embodiment, the relevant post has feature vectors within a predefined threshold of the feature vectors of the input post. The relevant post is associated with the brand. The relevant post includes one or more keywords that are common between the relevant post and the input post. The relevant post is posted by the marketer on one or more social channels, or relevant post posted by the viewer on the one or more social channels, or links posted by the viewers or the brand on the one or more social channels. The relevant post is the post already posted in response to a query or inquiry regarding the brand, or the post could have been posted otherwise as well without the query or the inquiry. The relevant post is the post already posted on social page of the brand. The social page can be present on the same social channel on which the input post is posted or any other social channel. For example, the input post can be posted on Facebook page of the brand while the relevant post can be determined as a post already posted on Twitter page of the brand and relating to the inquiry identified from content of the post on the Facebook page.

An inquiry is a set of keywords. The inquiry is a question related to the brand. The inquiry indicates the question raised by the viewer via the input post. The inquiry is identified based on content of the input post.

In the following discussion, an example environment is first described that is operable to employ techniques described herein. Following this, a section entitled "Example Procedures" describes some example procedures in accordance with one or more embodiments. Finally, a section entitled "Example Snapshots" indicates snapshots related to the example procedures in accordance with one or more embodiments.

Example Environment

FIG. 1 is a diagram of an environment 100 for providing response to an input post on a social page of a brand, according to one or more embodiments. The environment 100 includes one or more viewer devices, such as a viewer device 116A and a viewer device 116B. The viewer devices can communicate with an apparatus 102 via a network 118. The environment 100 also includes one or more marketer/brand devices (hereinafter referred to as the marketer devices), such as a marketer device 136. The marketer devices can communicate with a social networking apparatus 122 (hereinafter referred to as the apparatus 122) via the network 118. The environment 100 also includes a storage device 114 accessible via the network 118, or directly by the apparatus 102.

Hardware Description

Examples of the apparatus 102 include, but are not limited to, a desktop computer, server, a combination of one or more servers, or any other electronic device having one or more processors. The apparatus 102 can be present at one single location or can be present at different locations in a distributed environment.

The apparatus 102 includes a Central Processing Unit (CPU) 104, support circuits 106, and a memory 108. The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, and the like. The memory 108 may include at least one of Read Only Memory (ROM), Random Access Memory (RAM), disk drive storage, optical storage, removable storage or the like. The memory 108 includes an operating system 110, and a processing engine 112. The operating system 110 may include various commercially known operating systems.

The apparatus 102 may further include one or more input devices (not shown in FIG. 1) connected to the apparatus 102. Examples of the one or more input devices include, but are not limited to, peripheral devices, keyboard, mouse etc. In some embodiments, the apparatus 102 may not be connected to the input devices separately and may have functionalities of these input devices built into the apparatus 102, such as in cases in which the apparatus 102 is touch enabled device, gesture enabled device, or paired to such similar devices that act as the input devices.

The storage device 114 is, for example, a storage drive or a storage system, or a distributed or shared storage system.

Examples of the apparatus 122 include, but are not limited to, a desktop computer, server, a combination of one or more servers, or any other electronic device having one or more processors. The apparatus 122 can be present at one single location or can be present at different locations in a distributed environment.

The apparatus 122 includes a Central Processing Unit (CPU) 124, support circuits 126, and a memory 128. The CPU 104 may include one or more commercially available microprocessors or microcontrollers that facilitate data processing and storage. The various support circuits 126 facilitate the operation of the CPU 124 and include one or more clock circuits, power supplies, cache, input/output circuits, and the like. The memory 128 may include at least one of Read Only Memory (ROM), Random Access Memory (RAM), disk drive storage, optical storage, removable storage or the like. The memory 128 includes an operating system 130, and a hosting engine 132. The operating system 130 may include various commercially known operating systems.

The apparatus 122 may further include one or more input devices (not shown in FIG. 1) connected to the apparatus 122. Examples of the one or more input devices include, but are not limited to, peripheral devices, keyboard, mouse etc. In some embodiments, the apparatus 122 may not be connected to the input devices separately and may have functionalities of these input devices built into the apparatus 122, such as in cases in which the apparatus 122 is touch enabled device, gesture enabled device, or paired to such similar devices that act as the input devices.

Examples of the viewer devices include, but are not limited to, a desktop computer, a smartphone, a tablet computer, a laptop computer, a mobile computer or any other electronic device having one or more processors. Each viewer device includes a Central Processing Unit (CPU), support circuits, and a memory. The CPU may include one or more commercially available microprocessors or microcontrollers that facilitate data processing and storage. The various support circuits facilitate the operation of the CPU and include one or more clock circuits, power supplies, cache, input/output circuits, and the like. The memory may include at least one of Read Only Memory (ROM), Random Access Memory (RAM), disk drive storage, optical storage, removable storage or the like. The memory includes an operating system, and a browsing system. The operating system may include various commercially known operating systems. Each viewer device may further include one or more input devices connected to the corresponding viewer device. Examples of the one or more input devices include, but are not limited to, peripheral devices, keyboard, mouse etc. In some embodiments, the viewer device may not be connected to the input devices separately and may have functionalities of these input devices built into the viewer device, such as in cases in which the viewer device is touch enabled device, gesture enabled device, or paired to such similar devices that act as the input devices.

Examples of the network 118 include, but are not limited to, internet, local area network (LAN), wireless area network, wired area network etc.

Examples of the marketer devices include, but are not limited to, a desktop computer, a smartphone, a tablet computer, a laptop computer, a mobile computer or any other electronic device having one or more processors. The marketer device 136 includes a Central Processing Unit (CPU), support circuits, and a memory. The CPU may include one or more commercially available microprocessors or microcontrollers that facilitate data processing and storage. The various support circuits facilitate the operation of the CPU and include one or more clock circuits, power supplies, cache, input/output circuits, and the like. The memory may include at least one of Read Only Memory (ROM), Random Access Memory (RAM), disk drive storage, optical storage, removable storage or the like. The memory includes an operating system, and a browsing system. The operating system may include various commercially known operating systems. The marketer device 136 may further include one or more input devices connected to the marketer device 136. Examples of the one or more input devices include, but are not limited to, peripheral devices, keyboard, mouse etc. In some embodiments, the marketer device 136 may not be connected to the input devices separately and may have functionalities of these input devices built into the marketer device 136, such as in cases in which the marketer device 136 is touch enabled device, gesture enabled device, or paired to such similar devices that act as the input devices.

Functional Description

The functional working of the environment 100 is now explained. The apparatus 122 hosts a social networking website which can be accessed from the marketer device 136 or any of the viewer devices. A marketer of a brand creates an account with the social networking website. The marketer then creates a social page via the social networking website. The marketer posts content on the social page. In one embodiment, the marketer publishes a social post on the social page. The social page is accessible by the viewers. In illustrated scenario, a viewer accesses the social networking website via the viewer device 116A. The viewer logs into the social networking website using credentials. The viewer accesses the social post posted by the marketer on the social page of the brand. In response to viewing the social post or otherwise, i.e. without viewing the social post but accessing the social page, the viewer posts an input post on the social page. The input post is received by the apparatus 122 and the hosting engine 132 enables publishing of the input post on the social page of the brand.

The input post is also received by the apparatus 102. The apparatus 102 detects the input post upon posting of the input post on the social page. The brand also maintains an account with a cloud based service provided by the apparatus 102. The cloud based service, for example Adobe Social, helps the marketer, and hence the brand, in creating, managing or publishing social posts or any other content on the social page of the brand. The apparatus 102 can provide such service in any other form as well, for example as an application, plugin or any other form of providing the service. The marketer is informed regarding the input post via a portal or the service offered by the apparatus 102. The marketer can log into the service or can be notified using any notification technique. If marketer enables or configures the brand's account to allow the apparatus 102 to process the input post then the apparatus 102 processes the input post. The processing engine 112 processes the input post to identify inquiry from content of the input post. The inquiry is identified by identifying keywords or feature vectors from the input post. The inquiry includes a query related to the brand. Various techniques can be utilized for identifying the keywords or feature vector from the input post and have been described in detail in Example Procedures section. The keywords or feature vector can then be enhanced using synset. Synset is a group of data elements that are considered semantically equivalent for the purpose of information retrieval. Various techniques, for example machine learning based on WorldNet lexicon ontology can be used. Such techniques have been described in detail in Example Procedures section.

The processing engine 112 then interacts with the apparatus 122 or the storage device 114 to obtain one or more social posts from one or more social channels. In some embodiments, the one or more social posts are obtained from the social pages of the brand on the one or more social channels. While in some other embodiments, the one or more social posts can be obtained from the one or more social channels if it is related to the brand in some manner, for example if there is a mention of the brand on that social channel. The one or more social posts can include one or more of the posts posted by the marketer or the brand, posts posted by the viewers, or links posted by the marketer or the brand of the viewers. The one or more social posts can also include any other content, for example social conversations, posted by the marketer or the brand or the viewers on the one or more social channels. The posts can either be fetched directly from the storage device 114, if available, or from the apparatus 122 or any other storage to which the apparatus 122 has access. The posts are available with the storage device 114 if the apparatus 102 has processed the posts in past or has maintained a database in the storage device 114.

Each post is processed by the processing engine 112. The processing includes identifying keywords or feature vector for the processed post, i.e. processing the post based on the inquiry. The keywords or feature vector can then be enhanced using the synset. The keywords or feature vectors identified from the processed post are checked against the keywords or the feature vectors identified from the input post. The checking can be done using various techniques, for example cosine similarity technique. A similarity measure is determined between the keywords or feature vectors identified from the processed post and the keywords or the feature vectors identified from the input post. If the similarity measure is within a desired threshold then the processed post is identified as being relevant to the input post. The threshold can be a default setting or can be configured by the marketer. One or more posts meeting the threshold can be identified. Different thresholds indicating different similarity measure can also be used. For example, 100% similarity measure, 95% similarity measure etc. 100% similarity measure indicates perfect match and it may be possible that only one post meets such threshold. While there can be several posts meeting other thresholds which are not exact match but an approximate match.

In some embodiments, the posts meeting the threshold are processed by the processing engine 112 to determine if the posts are spam or not. The posts that are determined to be spam are filtered. Various techniques as described in details in Example procedures section can be used for determining spam posts.

In some embodiments, the posts that meet the threshold are processed by the processing engine 112 to determine sentiment of each post. Various techniques as described in details in Example procedures section can be used for determining sentiments. The posts having negative sentiments are filtered and the posts having neutral or positive sentiments are processed further. The sentiment and spam detection can happen in parallel or one after other. Any one of the sentiment detection or spam detection can happen first followed by the other.

In some embodiments, first all the posts posted by marketer are processed and if no post, meeting threshold and meeting requirements of spam detection and sentiment detection, is found then posts from viewers are processed. In alternative embodiments, posts are processed in any order or without any order.

At least one post meeting the threshold, and requirements of spam detection and sentiment detection, is identified as the post being relevant to the input post. The at least one post is then processed to create a response post from the at least one post. The response post addressed the inquiry identified from the input post. In one embodiment, the at least one post is automatically posted as it is as the response post on the social page where the input post was published. The response post is created using the content of the at least one post as it is. In another embodiment, the at least one post is provided as a recommendation to the marketer. The marketer can then provide inputs to edit the at least one post to create the response post. The response post can then include the edits made by the marketer and the content of the one or more relevant posts. The response post is then posted on the social page of the brand as a reply to the input post. The response post is posted in proximity to the input post. The response post can appear as a nested loop within the input post. The response post is logically nested to the input post.

In some embodiments, for each keyword or feature vector the posts meeting the threshold are stored in the storage device 114 along with the time when such mapping was performed. This helps in avoiding repeat processing of all the posts when already processed keyword or feature vector processing is required. The repeat processing can be avoided for the stored data but the processing needs to be done for the posts posted after the time saved with such mapping.

The content of the stored links may also change with time and hence, entity tag (etag) can be stored along with the links. The etag indicates if the webpage corresponding to the link has changed. If there is a change then the links for which change is there are re-processed. Else, the links are not processed again. The etag is an opaque identifier assigned by a web server to a specific version of a resource found at a URL (uniform resource locator). If the resource content at that URL ever changes, a new and different etag is assigned. Used in this manner etags are similar to fingerprints, and they can be quickly compared to determine whether two versions of a resource are the same.

The viewer can then view the response post via the viewer device 116A by logging into the social networking website. Automatic processing of the input post to determine the response post for the input post and posting the response post results in low turnaround time for providing reply to the input post. Low turnaround time results in retaining the viewer as a potential customer of the brand.

The algorithms and procedures for performing various operations of the apparatus 102 and the apparatus 122 are now explained in conjunction with example procedures.

Example Procedures

Figure 2:
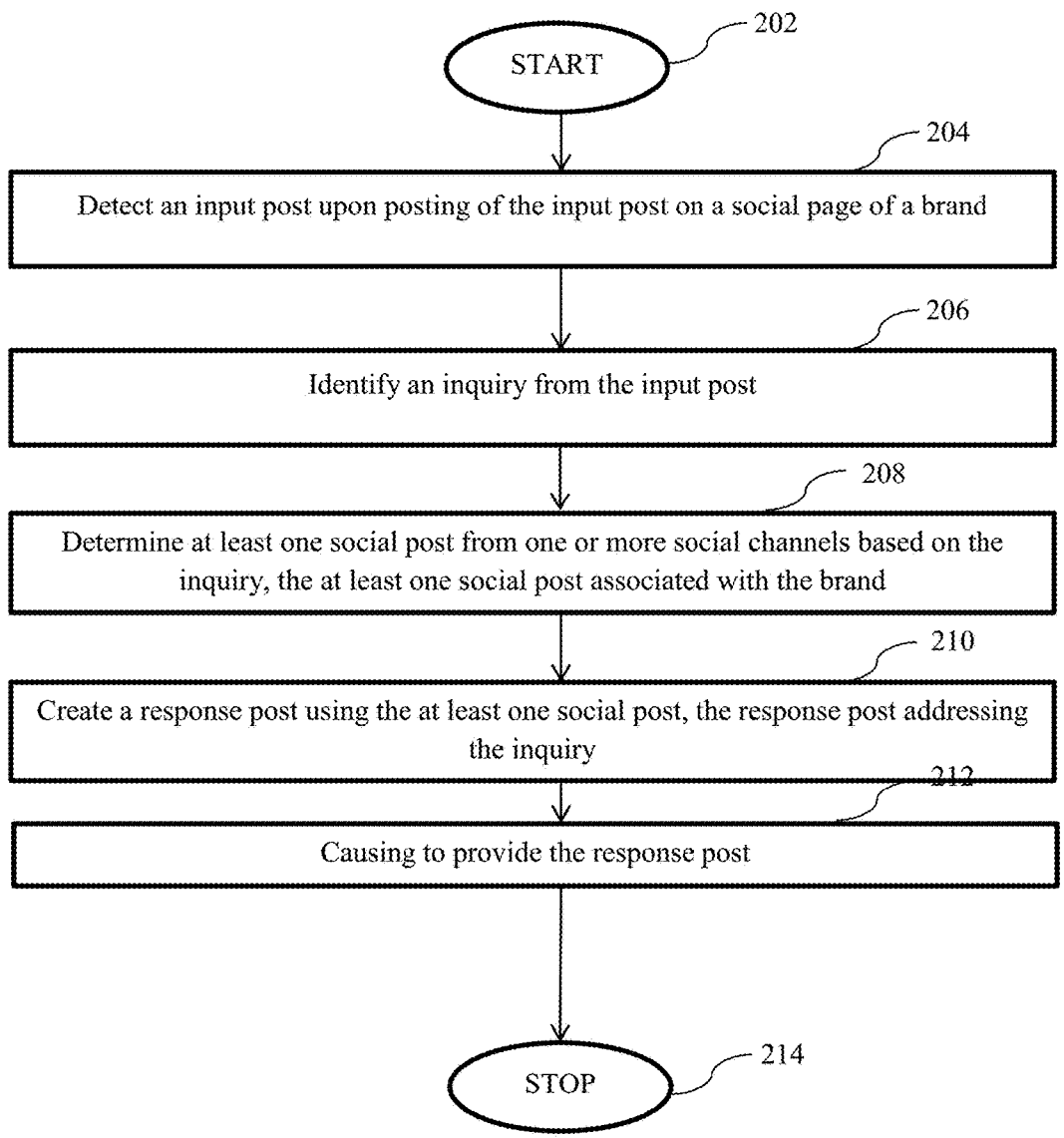
FIG. 2 is a flowchart of a procedure for providing response to an input post on a social page of a brand, according to one or more embodiments.

FIG. 2 is a flowchart of a procedure 200 for providing response to the input post on the social page of the brand by an electronic device or electronic system, for example the apparatus 102, or a combination of the viewer' devices, the marketer device 136, the apparatus 122 and the apparatus 102, of FIG. 1 according to one or more embodiments.

The procedure starts at step 202 and proceeds to step 204.

At step 204, the input post is detected upon posting of the input post on the social page of the brand. A viewer can browse the social networking website having the social page of the brand and may post a query on the social page. The input post is published on the social page of the brand by the social networking website. The input post is also detected by a social application, such as Adobe Social, used for managing social accounts of the brand. The social application runs on the marketer device, for example the marketer device 136, and interacts with the apparatus 102. The social application provides a user interface to the marketer to enable the marketer to manage various social accounts of the brand using the social application. The apparatus 102 includes processing engine 112 for processing requests coming from the marketer via the social application and enabling the managing of the social accounts.

At step 206, an inquiry is identified from the input post. The inquiry is identified by processing content of the input post. The input post is processed to identify keywords or feature vectors from the input post. In one embodiment, a part of speech tagger (POS) trained on brand's content is used to identify keywords or feature vectors of the input post. Examples of such POS includes, but are not limited to, Natural Language Toolkit (NLTK) POS etc. An exemplary way in which such POS works includes tokenizing the input post. The tokenized content is then converted to lower case. The conversion is then followed by stemming. Stemming is the process of finding stems of the words by reducing derived or infected words to their root or stems. NLTK POS offers two stemmers, Ported and Lancaster. Either can be used for performing the stemming. Stemming is then followed by lemmatization. Lemmatization is the process of grouping together different inflected forms of a word so that the group can be analyzed as a single item. Lemmatization is followed by POS tagging. POS tagging is the process of classifying words into parts of speech and labeling the words accordingly. Output of the POS tagging indicates whether a word is a noun, proper noun, verb adjective, pronoun, article etc. The output is then filtered to extract nouns, proper nouns and verbs. The extracted words are referred to as the keywords or the feature vectors of the input post. The keywords or the feature vectors form the inquiry and are representative of the query raised by the viewer in the input post.

In some embodiments, the inquiry, i.e. the keywords or the feature vectors, are enhanced by including synset. Synset is a group of data elements that are considered semantically equivalent for the purposes of information retrieval. In other words, the synset or synonym set is defined as a set of one or more synonyms that are interchangeable in some context without changing the truth value of the proposition in which they are embedded. In one embodiment, the synset is generated using a WordNet lexicon ontology. Any other technique for determining synset can also be used.

At step 208, at least one social post is determined from the one or more social channels based on the inquiry.

The one or more social posts from one or more social channels are then accessed or crawled. In one embodiment, the social posts related to the brand are accessed. The social posts can be accessed via application programming interfaces (APIs) provided by various social networking channels or websites. The social posts can also be accessed from storage device, for example the storage device 114, in case the social posts are available in the storage device. The social posts are then processed to determine keywords or feature vectors for each post. Various techniques, as described for processing the input post, can be used for determining the keywords or the feature vectors. In one embodiment, the posts posted by the marketers are processed first followed by other posts. In another embodiment, the posts posted by anyone can be processed in parallel or in random order. The keywords or feature vectors of the input post are then compared with the keywords or the feature vectors of each post to determine one or more social posts that are relevant to the input post. Various techniques, for example cosine similarity technique, can be used to determine similarity between keywords or feature vectors of the input post and keywords or feature vectors of each post. As a result of checking similarity, a similarity score can be assigned to indicate level of similarity. If the similarity score exceeds a threshold than the post is considered as relevant to the input post. Different thresholds indicating different level of similarity can be set. For example, 100% threshold indicates that the post and the input post are a perfect match. 95% indicates not perfect but high level of similarity. Based on how many posts are identified matching a certain threshold, the threshold can be varied. For example, if there are more than desired number of posts meeting 95% threshold then the threshold can be moved higher to shortlist a desired number of relevant posts.

In some embodiments, the relevant posts are further processed before creating the response post from the relevant posts. The relevant posts are passed through a spam detection engine to determine posts that are spam. The relevant posts that are spam are filtered out and are not considered as relevant posts. The spam detection can also be performed before matching the keywords or feature vectors of the posts with that of the input post. Various techniques can be used for spam detection. In one example, the spam detection engine includes a machine learning algorithm based on words or phrases found in spam dictionary and words or phrases found in regular dictionary. The algorithm works on regular expressions matching basis. The spam dictionary can be generated using a script that generates n-grams (phrases) from spam emails. An n-gram is a contiguous sequence of n items from a given sequence of text or speech. The items can include words, letters etc. The spam emails can be extracted from various email accounts. The machine learning algorithm can further be enhanced based on social data.

Additionally, the relevant posts are passed through a sentiment engine to determine sentiment of each post. The posts having negative sentiments are filtered out to provide relevant posts as the output. Various techniques can be used for sentiment detection. In one example, machine learning algorithm based on natural language processing (NLP) including lexicon based prediction. The lexicon based sentiment engine can make use of NLP or lexicons to understand the text and extract the sentiment into 3 categories: positive, negative and neutral.

The order of processing of the relevant posts may vary. In one embodiment, the posts can first be processed against the input post followed by spam detection followed by sentiment detection. In another embodiment, the posts can first be processed against the input post followed by sentiment detection followed by spam detection. In yet another embodiment, the posts can be only processed against the input post. In still another embodiment, the posts can undergo any one or both of spam and sentiment detection in any order first followed by the processing of the posts against the input post. As such, any order of processing can be used.

The identified relevant posts are then further processed to create the response (response post) for the input post. The relevant posts (at least one social post) can include one or more posts that are identified as being relevant to the input post.

At step 210, the response post to the input post is created using the relevant posts. In one embodiment, the response post creation includes using the content of the relevant post as it is in the response (response post). In another embodiment, the response post creation includes providing the relevant posts to the marketer as a recommendation. The recommendation can be provided in various ways. For example, providing textbox including the content of the relevant posts or providing thumbnails of the relevant posts or providing both. The marketer may then edit the relevant posts to create one single response post out of the relevant posts. The marketer provides inputs using a graphical user interface which are then received by the application, for example application hosted by the apparatus 102. The application then creates the response post based on the inputs from the marketer. The response post addresses the inquiry and provides a response for the inquiry.

At step 212, the response post is provided to the viewer. In one embodiment, the response post is provided by posting the response post automatically and electronically as a reply to the input post on the social page of the brand. The application causes the response post to be created, and posted or provided. The response post is posted in proximity to the input post. The response post and the input post forms part of a tree structure that logically links the input post and the response post. The response post and the input post are hierarchically nested or forms a hierarchy of question and answer. The response post and the input post are both structurally and logically linked to each other. Once the response post or the input post is posted, the response post or the input post is displayed on the social page unless the response post or the input post is manually deleted, or unless new input queries and responses are posted such that the social page cannot display the input post or the response post in addition to the newly posted input queries and responses. One can close the social page and revisit the social page later to view the response post and the input post. In another embodiment, the input from the marketer causes the response post to be posted. The marketer provides inputs that are used to create the response post and to post the response post. The response post can be provided via the social page using various options. For example, if emailing, messaging, faxing, posting response post on a webpage etc. is supported then such options can be used for providing the response post.

In some embodiments, for each keyword or feature vector the posts meeting the threshold are stored along with the time when such mapping was performed. The storing helps in avoiding repeat processing of all the posts when already processed keyword or feature vector processing is required. The repeat processing can be avoided for the stored data but the processing needs to be done for the posts posted after the time saved with such mapping.

The content of the stored links may also change with time and hence, entity tag (etag) can be stored along with the links. The etag indicates if the webpage corresponding to the link has changed. If there is a change then the links for which change is there are re-processed. Else, the links are not processed again. The etag is an opaque identifier assigned by a web server to a specific version of a resource found at a URL (uniform resource locator). If the resource content at that URL ever changes, a new and different etag is assigned. Used in this manner etags are similar to fingerprints, and they can be quickly compared to determine whether two versions of a resource are the same.

The procedure stops at step 214.

Example Snapshots

Figure 3A:
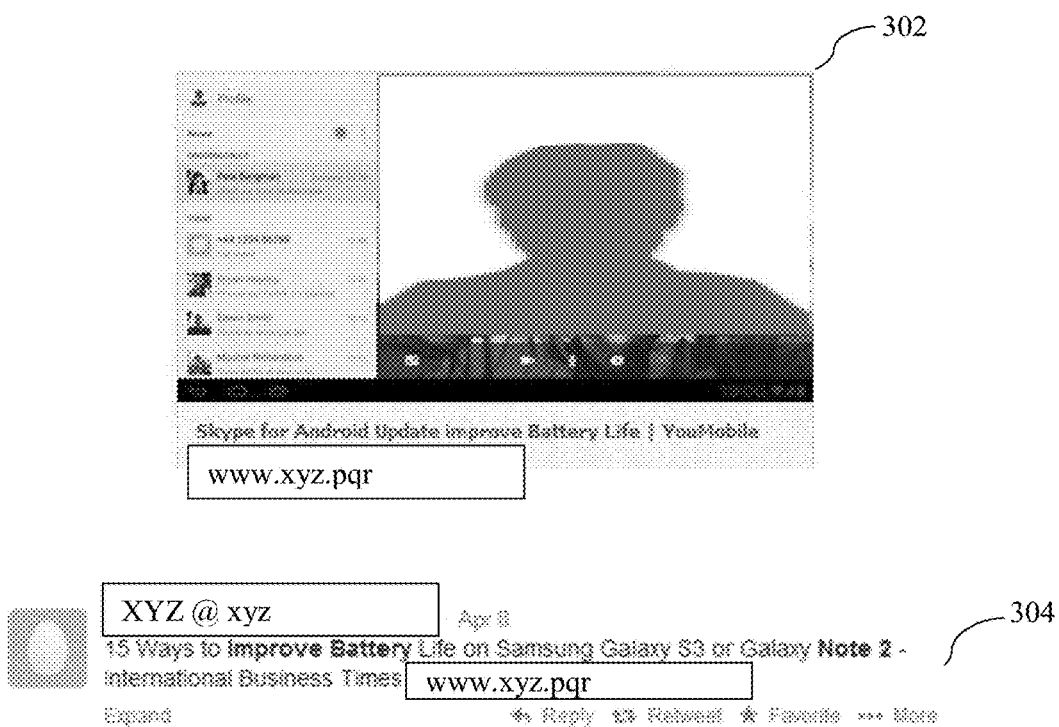
Figure 3C:
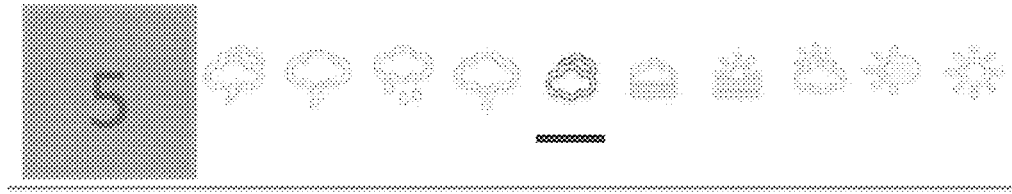

FIG. 3A, FIG. 3B, and FIG. 3C are diagrams illustrating procedure of providing response to the input post on the social page of the brand using an example, according to one or more embodiments.

In illustrated example, the viewer visits the social page of the brand. The viewer posts the input post "Can anyone tell me the best way to improve battery life on note 2?" The keywords or the feature vectors, i.e. inquiry, are identified as "battery", "life", "improve", and "note 2". The keywords or the feature vectors can be enhanced by including synset such as "better" is a synset for "improve".

The posts are then fetched from the one or more social channels and scanned. FIG. 3A illustrates a post 302 which is fetched and processed. The post 302 is processed to identify keywords or the feature vectors as "battery", "life", and "improve". Feature or keyword vector for the input post is represented as $d1=1, 1, 1, 1$ where 1 indicates each keywords. Feature or keyword vector for the post is represented as $d2=1, 1, 1, 0$ where 1 indicates each keyword and 0 is put in to fill in the missing space corresponding to fourth keyword in the input post. Cosine similarity between the feature vectors or keywords of the input post and the post is determined as follows:

Cosine similarity$(d1,d2)$=dot$(d1,d2)/(\|d1\|\|d2\|)$=3/(2*1.732)=0.866(high similarity)

dot$(d1,d2)$=(1)*(1)+(1)*(1)+(1)*(1)+(1)*(0)=3

$\|d1\|$=sqrt((1)^2+(1)^2+(1)^2+(1)^2)=2

$\|d2\|$=sqrt((1)^2+(1)^2+(1)^2+(0)^2)=1.732

In illustrated example, the similarity score 0.866 meets the threshold and the post 302 is identified as the relevant post, i.e. the post being determined as relevant to the input post.

In illustrated example, the post 302 is posted by the marketer previously and hence, the post 302 is selected as it is for the response and posted on the social page of the brand.

In another example, the post 302 is not present and hence, a post 304 posted by a viewer is considered. The feature vectors or the keywords are determined for the post 304 as "battery", "life", "improve", and "note 2". The cosine similarity between the post 304 and the input post is determined as 1 (very high similarity). The post 304 is then identified as the relevant post. The post 304 is then passed through a spam detection engine as shown in FIG. 3B. The output of the spam detection engine indicates that the post 304 is not a spam. The post 304 is also passed through the sentiment detection engine as shown in FIG. 3C. The sentiment of the post 304 is determined to be neutral and hence, the relevant post (the post 304) is posted as the response post of the input post on the social page of the brand. Similarly, a link posted by the viewer or the marketer on the social page of the brand is also processed. The content of the link is extracted and processed.

In illustrated example, the post 302 is a post posted on Facebook and the post 304 is a tweet posted on Twitter.

The embodiments of the present invention may be embodied as procedures, apparatus, electronic devices, and/or non-transient computer program products or computer readable medium. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable medium having computer-usable or computer-readable program code embodied in the non-transient medium for use by or in connection with an instruction execution apparatus. In the context of this document, a computer-usable or computer-readable medium may be any medium that can contain, store, communicate, propagate, or transport the program for use by or in connection with the instruction execution apparatus, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

Examples of the computer-usable or computer-readable medium include, but are not limited to, an electronic, magnetic, optical, electromagnetic, infrared, or semiconductor apparatus, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like or in scripting language, such as Perl, Python, PHP, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The procedures described herein may be implemented in software, hardware, or a combination thereof, in different embodiments. In addition, the order of procedures may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance.

In the foregoing detailed description, numerous specific details are set forth to provide a thorough understanding of claimed subject matter. However, it will be understood by those skilled in the art that claimed subject matter may be practiced without these specific details. For example, the claimed subject matter may be practiced by using different gestures or icons than that described. In other instances, procedures or apparatuses that would be known by one of ordinary skill have not been described in detail so as not to obscure claimed subject matter.

Some portions of the detailed description are presented in terms of algorithms or symbolic representations of operations on binary digital signals stored within a memory of a specific apparatus or specific electronic device or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Unless specifically stated otherwise, as apparent from the following discussion, it is appreciated that throughout this specification discussions utilizing terms such as "processing," "displaying," "receiving," "providing" or the like refer to actions or processes of a specific apparatus, such as a special purpose computer or a similar special purpose electronic device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic device.

Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A method comprising:
   detecting an input post, by an apparatus comprising at least one processor, upon posting of the input post on a social page of a brand, the social page being present on a social channel;
   identifying, by the apparatus, an inquiry regarding the brand from the input post;
   extracting, by the apparatus, one or more keywords from the inquiry;
   determining, by the apparatus, semantically equivalent terms for the extracted one or more keywords;
   generating, by the apparatus, a feature vector for the input post by using the one or more keywords and the semantically equivalent terms;
   determining, by the apparatus, at least one social post from already posted posts on one or more social channels, the at least one social post associated with the brand;
   accessing a database storing a mapping between the feature vector for the input post and one or more posts previously determined to be relevant to the feature vector for the input post;
   comparing a post time associated with the at least one social post and a latest mapping time associated with the mapping stored in the database; and
   based on determining that the post time associated with the at least one social post is earlier than the latest mapping time associated with the mapping:
      creating, by the apparatus, based on a similarity measure between a feature vector for the at least one social post and the feature vector for the input post, a response post using the at least one social post; and
      causing to post the response post, by the apparatus, on the social page of the social channel as a reply to the input post.

2. The method as claimed in claim 1, wherein extracting, by the apparatus, the one or more keywords from the inquiry comprises:
   using a part of speech tagger trained on content associated with the brand.

3. The method as claimed in claim 1, wherein determining the at least one social post comprises:
   identifying a social post having an associated feature vector within a predefined range of the feature vector for the input post as the at least one social post.

4. The method as claimed in claim 3, wherein determining the at least one social post comprises:
   crawling one or more social posts on the one or more social channels; and
   performing sentiment analysis on the one or more social posts to filter out social posts that have negative sentiments.

5. The method as claimed in claim 3, wherein determining the at least one social post comprises:
   crawling one or more social posts on the one or more social channels;
   generating feature vectors for the one or more social posts; and
   determining a similarity score between each feature vector of the feature vectors for the one or more social posts and the feature vector for the input post.

6. The method as claimed in claim 5 and further comprising:
   storing the similarity score between each feature vector of the feature vectors for the one or more social posts and the feature vector for the input post for further use.

7. The method as claimed in claim 1, wherein creating the response post comprises:
   recommending the at least one social post to a marketer of the brand;
   receiving an input from the marketer; and
   generating the response post based on the input of the marketer and based on content of the at least one social post.

8. The method as claimed in claim 1, wherein creating the response post comprises:
   extracting information from links present in the at least one social post; and
   generating the response post based on the information.

9. The method as claimed in claim 1, wherein the at least one social post comprises at least one of:
   a social post posted by a marketer of the brand on the one or more social channels, the one or more social channels comprising the social channel via which the input post is received;
   a social post posted by a user on the one or more channels; or
   a link posted by the user on the one or more channels.

10. The method as claimed in claim 1, further comprising based on determining that the post time associated with the at least one social post is later than the latest mapping time associated with the mapping:
    determining, by the apparatus, a feature vector for a second social post based on one or more keywords included in the second social post;
    determining, by the apparatus, the similarity measure between the feature vector for second social post and the feature vector for the input post;
    based on the similarity measure, determining, by the apparatus, whether the at least one social post is spam using a machine learning algorithm;

based on determining that the at least one social post is not spam, mapping the second social post to the feature vector for the input post in the database;

creating, by the apparatus, based on the similarity measure, the response post using the second social post; and causing to post the response post, by the apparatus, on the social page of the social channel as a reply to the input post.

11. A non-transitory computer readable storage medium comprising instructions that, when executed by at least one processor, cause a computing device to:

detect an input post upon posting of the input post on a social page of a brand, the social page being present on a social channel;

identify an inquiry regarding the brand from content of the input post;

extract one or more keywords from the inquiry;

determine semantically equivalent terms for the extracted one or more keywords;

generate a feature vector for the input post by using the one or more keywords and the semantically equivalent terms;

determine at least one social post from already posted posts on one or more social channels, the at least one social post associated with the brand;

access a database storing a mapping between the feature vector for the input post and one or more posts previously determined to be relevant to the feature vector for the input post;

compare a time associated with the at least one social post and a latest mapping time associated with the mapping stored in the database; and based on determining that the post time associated with the at least one social post is earlier than the latest mapping time associated with the mapping:

create, based on a similarity measure between a feature vector for the at least one social post and the feature vector for the input post, a response post using the at least one social post; and cause to post the response post on the social page of the social channel as a reply to the input post.

12. The non-transitory computer readable storage medium as claimed in claim 11, wherein the instructions, when executed by the at least one processor, cause the computing device to determine the at least one social post by:

identifying a social post having an associated feature vector within a predefined range of the feature vector for the input post as the at least one social post.

13. The non-transitory computer readable storage medium as claimed in claim 12, wherein the instructions, when executed by the at least one processor, cause the computing device to determine the at least one social post by:

crawling one or more social posts on the one or more social channels;

generating feature vectors for the one or more social posts; and determining a similarity score between each feature vector of the feature vectors for the one or more social posts and the feature vector for the input post.

14. The non-transitory computer readable storage medium as claimed in claim 11, wherein the instructions, when executed by the at least one processor, cause the computing device to create the response post by:

using content of the at least one social post as it is.

15. The non-transitory computer readable storage medium as claimed in claim 11, wherein the instructions, when executed by the at least one processor, cause the computing device to create the response post by:

recommending the at least one social post to a marketer of the brand;

receiving an input from the marketer; and generating the response post based on the input of the marketer and based on content of the at least one social post.

16. The non-transitory computer readable storage medium as claimed in claim 11, wherein the instructions, when executed by the at least one processor, cause the computing device to create the response post by:

extracting information from links present in the at least one social post; and generating the response post based on the information.

17. The non-transitory computer readable storage medium as claimed in claim 11, wherein the instructions, when executed by the at least one processor, cause the computing device to cause to post the response post by:

posting the response post on the social page in proximity to the input post.

18. An apparatus comprising:

a memory comprising computer-readable instructions; and one or more processors coupled to the memory, wherein the computer-readable instructions, when executed by the one or more processors, cause the apparatus to:

detect an input post upon posting of the input post on a social page of a brand, the social page being present on a social channel;

identify an inquiry regarding the brand from content of the input post;

extract one or more keywords from the inquiry;

determine semantically equivalent terms for the extracted one or more keywords;

generate a feature vector for the input post by using the one or more keywords and the semantically equivalent terms;

determine at least one social post from already posted posts on one or more social channels, the at least one social post associated with the brand;

access a database storing a mapping between the feature vector for the input post and one or more posts previously determined to be relevant to the feature vector for the input post;

compare a post time associated with the at least one social post and a latest mapping time associated with the mapping stored in the database; and based on determining that the post time associated with the at least one social post is earlier than the latest mapping time associated with the mapping:

create, based on a similarity measure between a feature vector for the at least one social post and the feature vector for the input post, a response post using the at least one social post; and cause to post the response post, on the social page of the social channel, as a reply to the input post.

19. The apparatus as claimed in claim 18, wherein the instructions, when executed by the one or more processors, cause the apparatus to determine the at least one social post by:

identifying a social post having an associated feature vector within a predefined range of the feature vector for the input post as the at least one social post.

20. The apparatus as claimed in claim 18, wherein the at least one social post comprises at least one of:

a social post posted by a marketer of the brand on the one or more social channels, the one or more social channels comprising the social channel via which the input post is received;

a social post posted by a user on the one or more channels; or a link posted by the user on the one or more channels.

* * * * *